United States Patent
Zheng et al.

(10) Patent No.: US 9,064,534 B1
(45) Date of Patent: Jun. 23, 2015

(54) PROCESS FOR PROVIDING A MAGNETIC RECORDING TRANSDUCER WITH ENHANCED PINNING LAYER STABILITY

(71) Applicant: Western Digital (Fremont), LLC, Fremont, CA (US)

(72) Inventors: Yuankai Zheng, Fremont, CA (US); Qunwen Leng, Palo Alto, CA (US); Cheng-Han Yang, Mountain View, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 230 days.

(21) Appl. No.: 13/691,729

(22) Filed: Nov. 30, 2012

(51) Int. Cl.
- *G11B 5/127* (2006.01)
- *H04R 31/00* (2006.01)
- *G11B 23/00* (2006.01)

(52) U.S. Cl.
CPC ..................................... *G11B 23/00* (2013.01)

(58) Field of Classification Search
USPC ............... 29/603.07, 603.08, 603.11–603.16, 29/603.18; 360/324.2, 324.1; 451/5, 41
See application file for complete search history.

(56) References Cited

U.S. PATENT DOCUMENTS

| | | | |
|---|---|---|---|
| 5,583,725 A * | 12/1996 | Coffey et al. | ............ 360/324.11 |
| 5,804,250 A | 9/1998 | Yang | |
| 6,033,491 A | 3/2000 | Lin | |
| 6,129,957 A | 10/2000 | Xiao et al. | |
| 6,315,839 B1 | 11/2001 | Pinarbasi et al. | |
| 6,322,640 B1 | 11/2001 | Xiao et al. | |
| 6,388,847 B1 * | 5/2002 | Horng et al. | ............. 360/324.11 |
| 6,413,325 B1 | 7/2002 | Shimazawa et al. | |
| 6,430,015 B2 | 8/2002 | Ju et al. | |
| 6,452,385 B1 | 9/2002 | Shimazawa et al. | |
| 6,478,884 B2 | 11/2002 | Shimazawa et al. | |
| 6,482,657 B2 | 11/2002 | Shimazawa | |
| 6,556,392 B1 * | 4/2003 | Mao et al. | ................. 360/324.12 |
| 6,636,393 B1 * | 10/2003 | Araki et al. | ............... 360/324.11 |
| 6,700,760 B1 * | 3/2004 | Mao | .......................... 360/324.2 |
| 6,724,581 B2 | 4/2004 | Westwood | |
| 6,754,048 B2 | 6/2004 | Li et al. | |
| 6,848,169 B2 | 2/2005 | Shin et al. | |
| 6,876,507 B2 | 4/2005 | Chen et al. | |
| 6,998,061 B1 | 2/2006 | Cross | |
| 7,150,093 B2 | 12/2006 | Beach | |
| 7,166,173 B2 | 1/2007 | Beach | |
| 7,270,896 B2 | 9/2007 | Parkin | |
| 7,443,639 B2 | 10/2008 | Parkin | |
| 7,606,010 B2 | 10/2009 | Parkin | |
| 7,666,467 B2 | 2/2010 | Parkin | |
| 7,807,218 B2 | 10/2010 | Parkin | |
| 7,906,231 B2 | 3/2011 | Parkin | |

(Continued)

*Primary Examiner* — Paul D Kim

(57) ABSTRACT

A method is provided for providing a magnetic recording transducer having a pinning layer with high pinning field stability. A bottom structure comprising a substrate, a magnetic shield above the substrate, a magnetic seed layer above the shield, a nonmagnetic spacer layer above the magnetic seed layer, and a layer of antiferromagnetic (AFM) material on the nonmagnetic spacer layer is provided. The bottom structure is heated to a temperature of at least 373 Kelvin (K) and then the bottom structure is cooled until the temperature of the structure is reduced to less than 293K. A pinned layer is deposited on the AFM layer, a nonmagnetic spacer is provided on the pinned layer, and a read sensor fabricated above the nonmagnetic spacer. In one embodiment, cooling the structure comprises reducing the temperature of the structure by at least 100K in less than 25 minutes.

13 Claims, 4 Drawing Sheets

(56) References Cited

U.S. PATENT DOCUMENTS

| | | |
|---|---|---|
| 8,008,097 B2 | 8/2011 | Parkin |
| 2004/0196681 A1 | 10/2004 | Xiao et al. |
| 2006/0003185 A1 | 1/2006 | Parkin |
| 2007/0053114 A1 | 3/2007 | Uesugi et al. |
| 2007/0111332 A1 | 5/2007 | Zhao et al. |
| 2008/0179699 A1 | 7/2008 | Horng et al. |
| 2009/0027810 A1 | 1/2009 | Horng et al. |
| 2009/0128944 A1 | 5/2009 | Jang et al. |
| 2010/0320076 A1 | 12/2010 | Zhao et al. |
| 2011/0102949 A1 | 5/2011 | Yuan et al. |

* cited by examiner

|  | Heat | Cool | $H_{cp}$ (Oe) | $H_{ex}$ (Oe) | $dH_{ex} / H_{ex}$ (%) | $J_{ex}$ (erg/cm^2) |
|---|---|---|---|---|---|---|
| Case 1 | No | No | 440 | -1954 | 0 | 0.51 |
| Case 2 | No | Yes | 463 | -2030 | 4 | 0.53 |
| Case 3 | Yes | No | 499 | -2221 | 14 | 0.58 |
| Case 4 | Yes | Yes | 591 | -2863 | 47 | 0.74 |

FIG. 6

PROCESS FOR PROVIDING A MAGNETIC RECORDING TRANSDUCER WITH ENHANCED PINNING LAYER STABILITY

BACKGROUND OF THE INVENTION

Disk drives typically use heads residing on sliders to read from and write to the magnetic media. Read and write transducers residing in the head are flown at a small, controlled spacing above the magnetic medium (disk) during read and write operations. An air bearing forms between the head and the disk due to the disk rotating at high speeds to provide controlled head to disk spacing. Magnetic fields emanating from the write transducer pole tip switches magnetization of the magnetic medium, i.e., writing to the medium. Among other factors, a smaller and more tightly controlled magnetic writing field will allow more data to be written in the same space, thereby increasing areal density.

FIG. 1 illustrates a side section view of read/write head 100 incorporating a write transducer 150 and read transducer 110, both facing the ABS 190. The read transducer 110 may include shield 111 and shield 113 as well as read sensor 112. Write transducer 150 includes shield 114, main pole 101, assist pole (or auxiliary pole) 101', coil 140 and coil 140', leading shield 117 and trailing shield 120. Side shields are not shown in this sectional view, however may reside on the sides of main pole 101. Main pole 101 has trailing bevel 101a and a leading bevel 101b. A leading nonmagnetic gap layer 104 separates main pole 101 from underlying structures, and trailing nonmagnetic gap layer 105 separates main pole 101 from structures above. A nonmagnetic spacer layer 102 is illustrated on the non-beveled section of main pole 101; however, in other embodiments may be provided above main pole 101 beginning at any point distal from the ABS 190, including on bevel 101a.

FIG. 2 illustrates an ABS view of a read transducer section 200 analogous to read sensor 110 described in FIG. 1. A read sensor 260 is positioned between magnetic bottom shield 250 and magnetic top shield 280 and between side shield 274 and 274'. In one embodiment, nonmagnetic layers 275 and 275' may be applied above side shields 274 and 274' respectively. The addition of nonmagnetic layers 275 and 275' may be desirable to separate a side shield comprising a hard bias from a soft magnetic material in magnetic top shield 280 above. A nonmagnetic gap layer 273 is analogous to nonmagnetic gap layer 105 in FIG. 1.

BRIEF DESCRIPTION OF THE DRAWINGS

FIG. 6 is a chart showing performance characteristics of a recording transducer in accordance with one embodiment of the invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention. References to top, side, bottom, or similar terms are used for descriptive purposes with reference to the figures and descriptions and should not be taken as limiting the scope of the invention.

Figure 1:
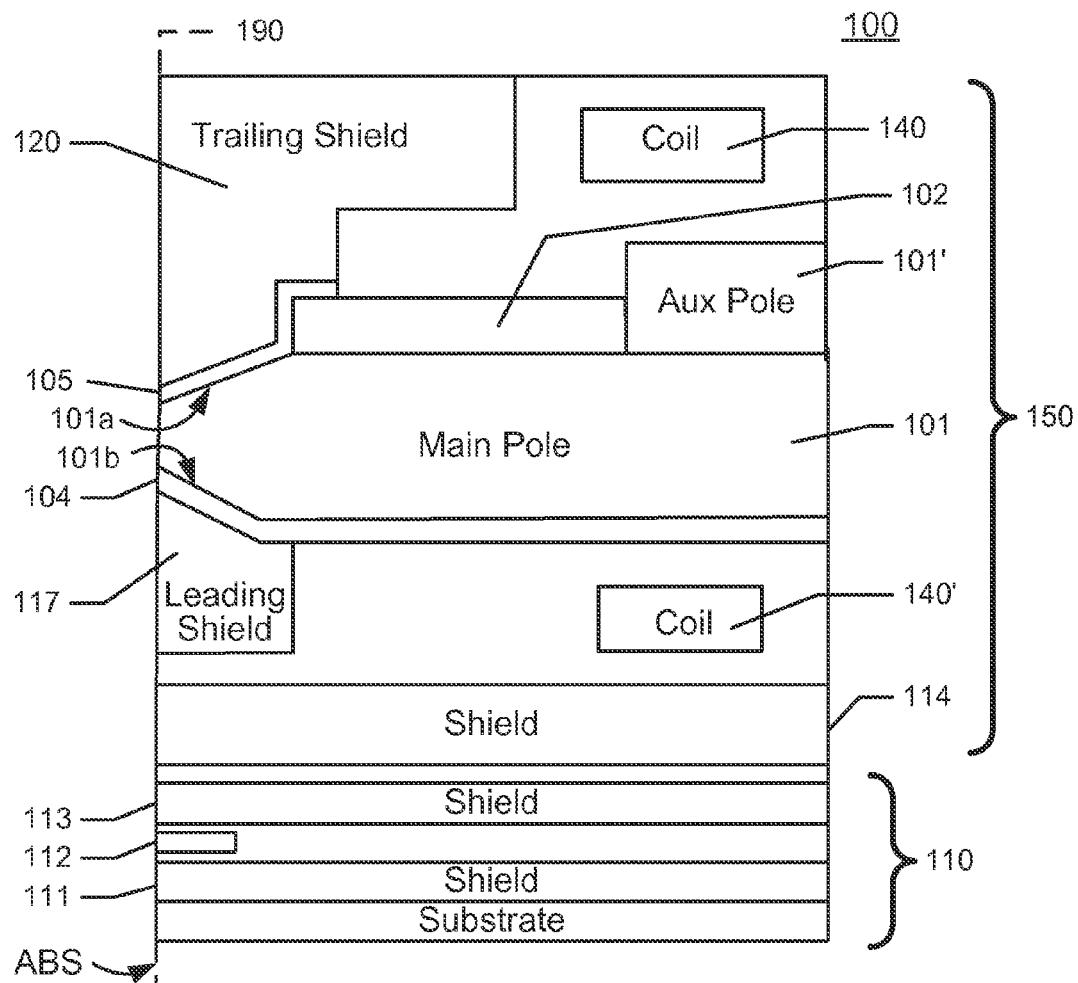
FIG. 1 illustrates a side section view of a portion of a read-write recording transducer.
Figure 2:
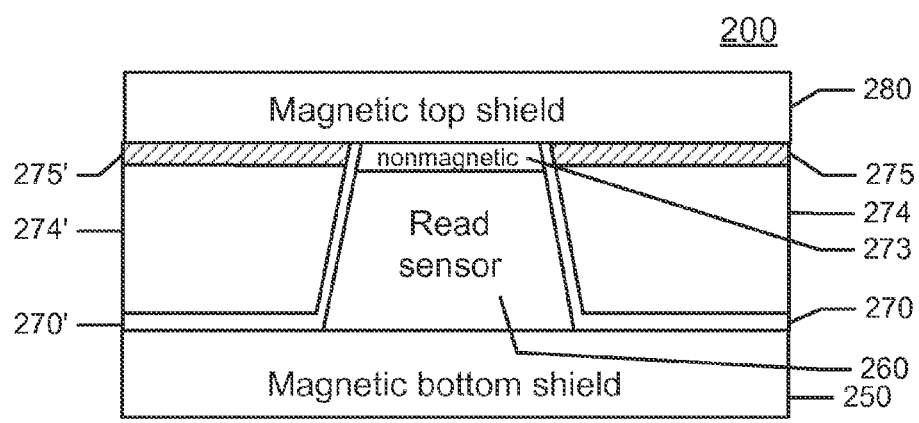
FIG. 2 illustrates an ABS section view of a read transducer portion of a recording head.
Figure 3:
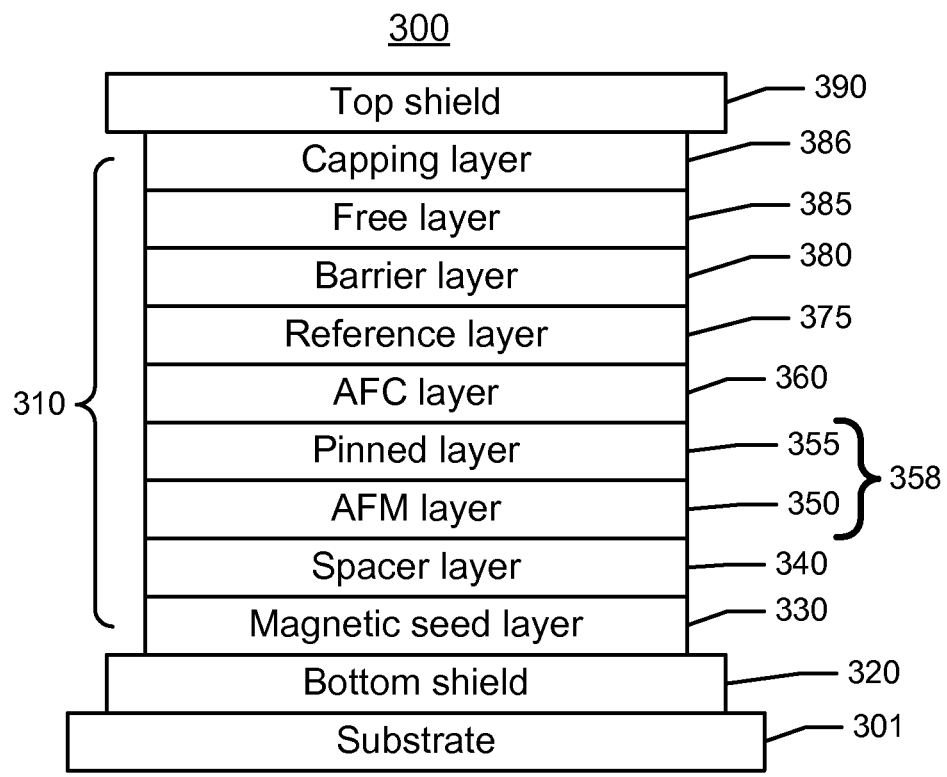
FIG. 3 illustrates a view of a read transducer comprising multiple layers positioned between shields in accordance with one embodiment of the invention.

FIG. 3 illustrates a view of a read transducer 300 comprising multiple layers positioned between shields, and is an embodiment analogous to one described generally in FIG. 2, however, the side structures are not depicted. A bottom shield 320 resides on a substrate 301. The substrate 301 may be any suitable underlayer and may include, for example, alumina (AlOx). A read sensor 310 resides above bottom shield 320. Bottom shield 320 may comprise soft magnetic material. A top shield 390 resides above and magnetically shields the read sensor 310. Top shield 390 may comprise soft magnetic material and in one embodiment comprises the same soft magnetic material as in bottom shield 320.

In one embodiment of the invention, read sensor 310 comprises magnetic seed layer(s) 330, spacer layer 340, AFM layer 350, pinned layer 355, and AFM coupling (AFC) layer 360. In one embodiment of the invention, AFM Layer 350 may comprise one of IrMn, RhMn, RuMn, or FeMn; and in another embodiment may comprise one of PdMn, NiMn, or PtMn if a higher blocking temperature is desired. Spacer layer 340 functions to magnetically separate the magnetic seed layer(s) 330 from AFM layer 350, so the magnetic seed layer 330 won't be pinned by AFM layer 350. The magnetic seed layer 330 may comprise a bilayer. In one embodiment of the invention, spacer layer 340 may comprise, for example, Ru, Ti, or Ta, or their combinations.

Pinned layer 355 is above AFM layer 350 and may comprise, for example, CoFe or CoFeB. The AFM layer 350 stabilizes the pinned layer 355. The magnetization (not shown) of pinned layer 355 is substantially fixed, or pinned. The magnetization is fixed by annealing the read sensor 310, or a portion thereof, in an oriented magnetic field at an annealing temperature. AFM layer 350 and pinned layer 355 together form a pinning-pinned combination 358. AFC layer 360 is above pinned layer 355 and provides anti-parallel alignment from the pinned layer 355 to reference layer 375 above, and may comprise, for example, Ru.

A barrier layer 380 is above reference layer 375 and a free layer 385 above barrier layer 380. A capping layer 386 is above free layer 385. The read sensor 310 has a resistance that varies in response to the relative magnetic orientations of the reference layer 375 below the barrier layer 380, and the free layer 385 above the barrier layer 380. The orientation of free layer 385 may move, or switch, in response to an external field such as that from a magnetic recording medium. A sense current may be passed between bottom shield 320 and top shield 390; and as the magnetic field emanating from the recording medium passes the free layer 385, the resistance changes, thereby affecting the sense current, which may be used to provide an electrical signal. This configuration is referred to as current perpendicular to plane (CPP), although other configurations known in the art such as current in plane (CIP) may also be used. Other and/or different components may be fabricated in other embodiments. For example, in some embodiments, coupling enhancing layers, stop layers and/or seed layers may also remain between layers as part of the fabrication process.

Figure 4:
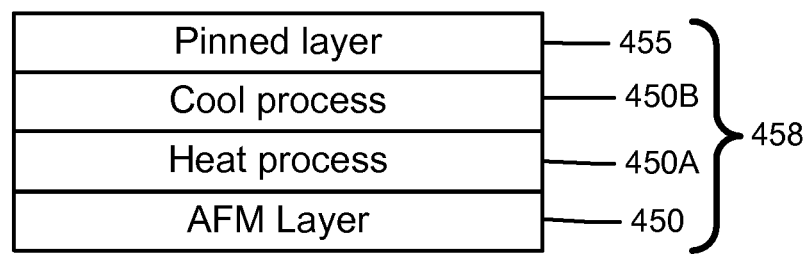
FIG. 4 illustrates a fabrication detail of a bottom portion of a read transducer in accordance with one embodiment of the invention.

FIG. 4 illustrates a fabrication detail of a pinning-pinned combination 458 of a read transducer in accordance with one embodiment of the invention, and is analogous to pinning-pinned combination 358 in FIG. 3. In FIG. 4, AFM layer 450 is analogous to AFM layer 350 in FIG. 3, and pinned layer 455 is analogous to pinned layer 355 in FIG. 3. AFM layer 450 comprises antiferromagnetic material, and provides a magnetic pinning field to the pinned layer 455. As areal recording density increases, the sensor size must be made smaller, and similarly the pinning layer size must be reduced. In order to preserve thermal stability of the pinned layer, the pinning field strength ($H_{ex}$) may be increased to overcome loss from its smaller physical size. If the thermal stability is compromised, the pinning field of AFM layer 450 could change or even completely reverse, and result in a sensor failure. In one embodiment of the invention, an increased $H_{ex}$ may be provided by a thermal heating and cooling process, and the sensor will remain stable even at a much smaller size.

In one embodiment of the invention, after deposition of a magnetic seed layer 330 and spacer layer 340 as described in FIG. 3, AFM layer 450 illustrated in FIG. 4 is deposited above the spacer layer 340, completing a bottom structure. In one embodiment, AFM Layer 450 may comprise one of IrMn, RhMn, RuMn, or FeMn; and in another embodiment may comprise one of PdMn, NiMn, or PtMn if a higher blocking temperature is desired.

After deposition of AFM layer 450, the resulting structure is subjected to a heat process 450A. In one embodiment of the invention, the heat process heats the structure to at least 373 Kelvin (K). The heating process may be by resistance heating, or by rapid thermal process, or by any other suitable means.

After the resulting structure has been heated, a cooling process 450B is performed. In one embodiment of the invention, the cooling process may comprise application of a cooling plate that has a surface temperature of between about 50K and 270K to the structure. In another embodiment, the cooling process 450B comprises subjecting the resulting structure to a cooling gas; and in a further embodiment, the cooling gas may comprise cryogenic nitrogen or helium.

In another embodiment of the invention, the cooling process 450B comprises reducing the temperature of the structure by at least 100K in less than 25 minutes.

After cooling process 450B, a pinned layer 455 is deposited on AFM layer 450. Pinned layer 455 is analogous to pinned layer 355 in FIG. 3. In one embodiment of the invention, pinned layer 455 may comprise CoFe or CoFeB. After depositing pinned layer 455, the remaining layers of read transducer 300 are fabricated as described in FIG. 3. As part of the fabrication of the read sensor, either as additional layers are provided after pinned layer 455, or after all the layers of the read sensor 310 have been provided, the sensor may undergo additional thermal processes.

The pinning field $H_{ex}$ may be increased by the combination of heating process 450A and cooling process 450B. This increase in $H_{ex}$ persists, and is not significantly degraded by subsequent thermal annealing processes in the subsequent head fabrication; for example, those processes needed to provide magnetic orientation of the AFM layer 450, even though subsequent annealing may be at a higher temperature than heating process 450A. In one embodiment of the invention, after providing the sensor 310, the resulting structure is annealed at a temperature of at least 540K for at least one hour.

Figure 5:
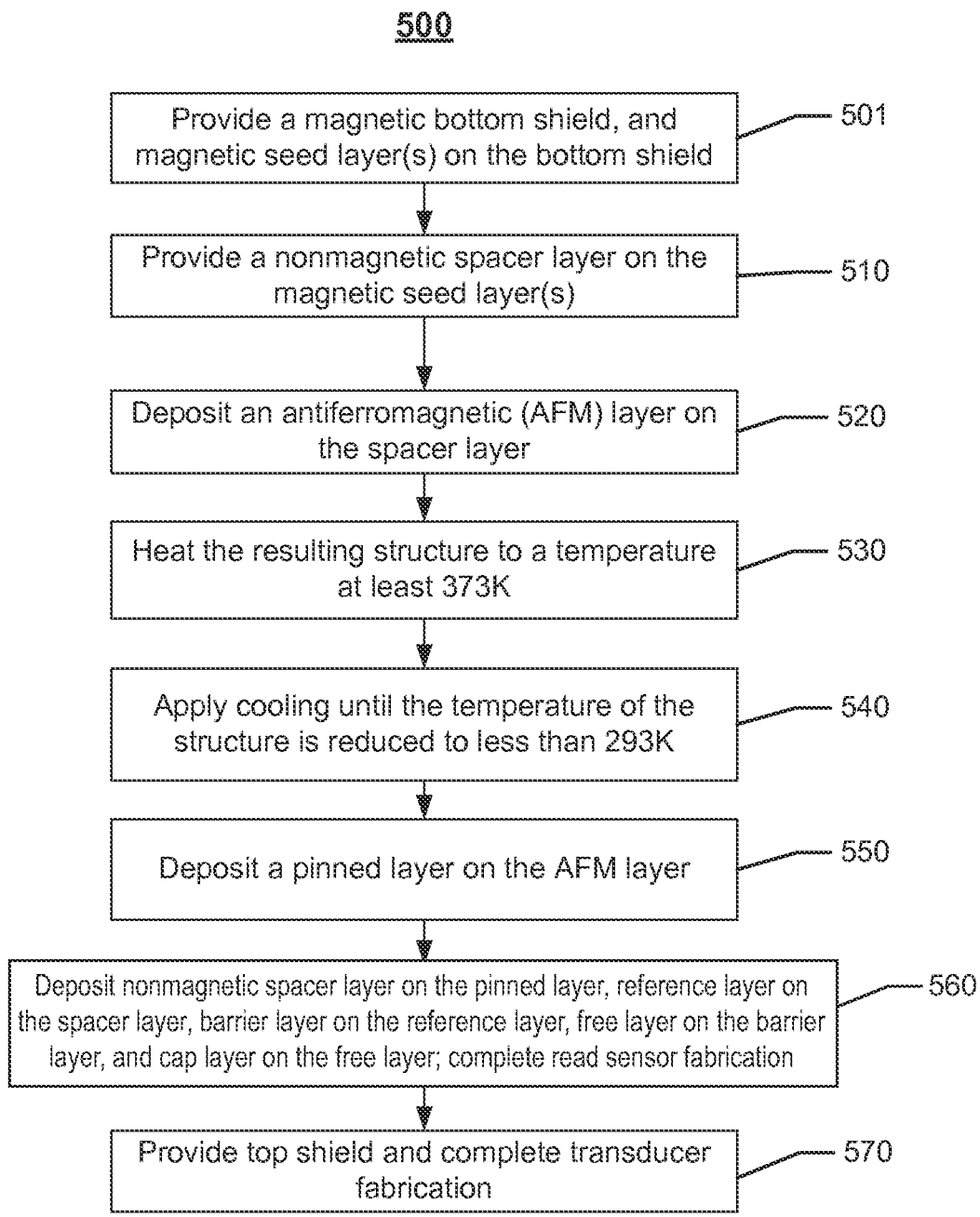
FIG. 5 illustrates a process for fabricating a recording transducer in accordance with one embodiment of the invention.

FIG. 5 illustrates a process 500 for fabricating a magnetic recording transducer with enhanced pinning layer stability according to one embodiment of the invention.

Beginning in block 501, a magnetic bottom shield is provided above a substrate. A magnetic seed layer is provided above the magnetic bottom shield. In block 510, a nonmagnetic spacer layer is provided on the magnetic seed layer. In block 520, an AFM layer comprising antiferromagnetic material is deposited on the spacer layer.

In block 530, the structure including the AFM layer is heated to a temperature of at least 373K.

In block 540, the heated structure is cooled in a cooling process until the temperature of the structure is reduced to less than 293K. In one embodiment of the invention, the cooling process may comprise application of a cooling plate that has a surface temperature of between about 50K and 270K to the structure. In another embodiment, the cooling process comprises subjecting the structure to a cooling gas; and in a further embodiment, the cooling gas may comprise cryogenic nitrogen or helium. In another embodiment of the invention, the cooling process comprises reducing the temperature of the structure by at least 100K in less than 25 minutes, and prior to deposition of overlaying layers.

In block 550, a pinned layer is deposited on the structure.

In block 560, a spacer layer, reference layer, barrier layer, free layer, and cap layers are provided above the pinned layer, and the read sensor fabrication completed.

In bock 570, a top shield is provided and the read transducer fabrication completed.

FIG. 6 is a chart that illustrates the performance of a read sensor fabricated according to embodiments of the invention.

The rows 601-604 in the chart in FIG. 6 represent performance data from four different cases. Each of the four cases employs different heating and cooling scenarios of an AFM layer similar to AFM layer 450 in FIG. 4. The heating process is similar to heating process 450A in FIG. 4 and the cooling process is similar to the cooling process 450B in FIG. 4.

Column 610 designates whether a heating process was performed, and column 620 designates whether a cooling process was performed.

Column 630 records the coercivity of the pinned layer (Hcp) in Oersteads (Oe), and column 640 records the pinning field strength $H_{ex}$(Oe). Column 650 records the percent improvement of $H_{ex}$ of each of the four cases, and column 660 records the surface pinning strength ($J_{ex}$) of the AFM layer-pinned layer combination measured in erg/cm$^2$.

The first case 601 is a reference case that does not include any heating or cooling processes of the AFM layer after deposition.

In the second case 602, no heating process was used, however a cooling process was performed that reduced the structure temperature to less than 293K. Comparing the effectiveness of cooling-only process with the first case 601 demonstrates that only slight improvements in $H_{ex}$ and $J_{ex}$ were achieved.

In the third case 603, a heating process was performed that heated the structure to above 373K; however no forced cooling process was employed prior to depositing the pinned layer. Comparing the effectiveness of the heating only process, it can be seen that the $H_{ex}$ (shown in column 650) is improved from the first case 601 by about 14%. The third case is incrementally better and is advantageous over both the first case 601 and the second case 602.

In the fourth case 604, the structure was subjected to a heating process that heated the structure to above 373K; and also to a cooling process that cooled the heated structure to below 293K in less than 25 minutes. The combination of heating and cooling significantly affected the $H_{ex}$ and $J_{ex}$ of the structure. The $H_{ex}$ was increased by about 47% over case 1 which did not undergo any heating or cooling process; and also increased by large margins over the second case 602 and the third case 603 as shown in column 650. The $J_{ex}$ (column 660) was also significantly increased from 0.51 in the first case 601 to 0.74 in the fourth case 604. This increase in $J_{ex}$ results in stronger pinning strength, and provides the benefits of higher pinning stability and an improved read transducer performance.

The heating and cooling process was performed directly after the AFM layer was deposited, and subsequently, the remaining layers of the read sensor were deposited. As part of the read sensor fabrication, there may be an additional heating process to anneal, for example, the barrier layer. This annealing may be at high temperatures, for example at about 573K. Experimental results indicate that the benefits of increased $H_{ex}$ and $J_{ex}$ persist without significant degradation even after subsequent annealing of the barrier layer. This stability of the pinning layer enables smaller transducers and higher recording density.

The description of the invention is provided to enable any person ordinarily skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those ordinarily skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A method for providing a magnetic recording transducer with high pinning field stability, the method comprising:
   providing a bottom structure comprising a substrate, a magnetic shield above the substrate, a magnetic seed layer above the shield, a first nonmagnetic spacer layer above the magnetic seed layer, and a layer of antiferromagnetic (AFM) material on the first nonmagnetic spacer layer;
   heating the bottom structure to a temperature of at least 373 Kelvin (K);
   cooling the bottom structure until the temperature of the bottom structure is reduced to less than 293K;
   depositing a pinned layer on the AFM layer;
   providing a second nonmagnetic spacer on the pinned layer, and
   providing a top structure on the second nonmagnetic spacer.

2. The method of claim 1 wherein the cooling the bottom structure comprises reducing the temperature of the bottom structure by at least 100K in less than 25 minutes.

3. The method of claim 1 wherein the cooling the bottom structure comprises application of a cooling plate that has a surface temperature between 50K and 270K to the structure.

4. The method of claim 1 wherein the cooling the bottom structure comprises subjecting the bottom structure to a cooling gas.

5. The method of claim 4 wherein the cooling gas comprises cryogenic nitrogen or helium.

6. The method of claim 1 wherein the AFM material comprises one of IrMn, RhMn, RuMn, or FeMn.

7. The method of claim 1 wherein the AFM material comprises one of PtMn, NiMn, PdMn, or PtPdMn.

8. The method of claim 1 wherein the pinned layer comprises CoFe or CoFeB.

9. The method of claim 1 wherein the AFM material comprises IrMn and the pinned layer comprises CoFe or CoFeB.

10. The method of claim 1 wherein after providing the top structure, the bottom structure, the pinned layer, the second nonmagnetic layer, and the top structure together are annealed at a temperature of at least 540K for at least one hour.

11. The method of claim 1, wherein the top structure comprises a reference layer above the second nonmagnetic layer, a barrier layer above the reference layer, a free layer above the barrier layer, and a capping layer above the free layer.

12. The method of claim 11, wherein the magnetic seed layer, the first nonmagnetic spacer layer, the AFM layer, the pinned layer, the second nonmagnetic spacer layer, the reference layer, the barrier layer, the free layer, and the capping layer together comprise a read sensor.

13. The method of claim 12, further comprising annealing the substrate, the magnetic shield, and the read sensor together at a temperature of at least 540K for at least one hour.

* * * * *